United States Patent [19]

Baldwin

[11] Patent Number: 5,638,851

[45] Date of Patent: Jun. 17, 1997

[54] MODULAR SHELTER

[76] Inventor: David Baldwin, 2584 NW 20th St., Ft. Lauderdale, Fla. 33311

[21] Appl. No.: 590,780

[22] Filed: Jan. 24, 1996

[51] Int. Cl.⁶ .................................................. E04H 15/36
[52] U.S. Cl. ........................ 135/124; 403/205; 248/910; 248/519; 135/119; 135/117; 135/116; 135/138; 135/96; 135/139
[58] Field of Search ..................................... 285/373, 419, 285/150; 248/910, 519, 523; 403/205, 403; 135/87, 96, 97, 124, 138, 115, 117, 119, 118, 116, 137, 909, 139

[56] References Cited

U.S. PATENT DOCUMENTS

| | | | |
|---|---|---|---|
| 413,730 | 10/1889 | Palmer | 403/205 X |
| 1,388,478 | 8/1921 | Nelson | 135/116 X |
| 1,570,887 | 1/1926 | Graves | 285/373 X |
| 1,759,117 | 5/1930 | Hopp | 135/138 |
| 1,925,815 | 9/1933 | Nicolson . | |
| 2,151,908 | 3/1939 | Gottlieb | 135/117 X |
| 2,649,102 | 8/1953 | McDonough . | |
| 2,688,973 | 9/1954 | Reiman . | |
| 2,737,397 | 3/1956 | Turner . | |
| 3,172,419 | 3/1965 | Lewis | 135/119 |
| 3,463,174 | 8/1969 | Heller . | |
| 3,474,802 | 10/1969 | Loring . | |
| 3,480,023 | 11/1969 | McConnell et al. . | |
| 3,749,107 | 7/1973 | Laberge . | |
| 3,868,155 | 2/1975 | Cherubini . | |
| 3,892,094 | 7/1975 | Spray . | |
| 4,079,559 | 3/1978 | Tenbrummeler | 248/519 X |
| 4,641,676 | 2/1987 | Lynch . | |
| 4,702,478 | 10/1987 | Kruse . | |
| 4,706,696 | 11/1987 | Gillis | 135/138 X |
| 4,827,958 | 5/1989 | Cantwell et al. | 135/119 X |
| 4,886,083 | 12/1989 | Gamache . | |
| 4,944,321 | 7/1990 | Moyet-Ortiz . | |
| 4,971,384 | 11/1990 | Baldwin . | |
| 4,991,612 | 2/1991 | Kiss et al. . | |
| 5,261,436 | 11/1993 | Funk | 403/205 X |
| 5,301,706 | 4/1994 | Jones . | |
| 5,354,031 | 10/1994 | Bilotti | 248/910 X |

FOREIGN PATENT DOCUMENTS

| 85530 | of 1895 | Germany . | |
|---|---|---|---|
| 0082583 | 2/1948 | Norway | 248/519 |

Primary Examiner—Wynn E. Wood
Attorney, Agent, or Firm—Herbert L. Lerner; Laurence A. Greenberg; Adam A. Jorgensen

[57] ABSTRACT

A modular shelter comprising a framework for supporting a cover sheet, the framework including at least two frames each composed of an upward curved arch having two ends, two upstanding legs, each leg having an upper end connected to a respective end of said arch by means of respective upward angled connecting members, each arch end attached to a respective upper end of said legs, each leg having a bottom end, and anchoring means for anchoring the bottom end of each leg to ground.

19 Claims, 8 Drawing Sheets

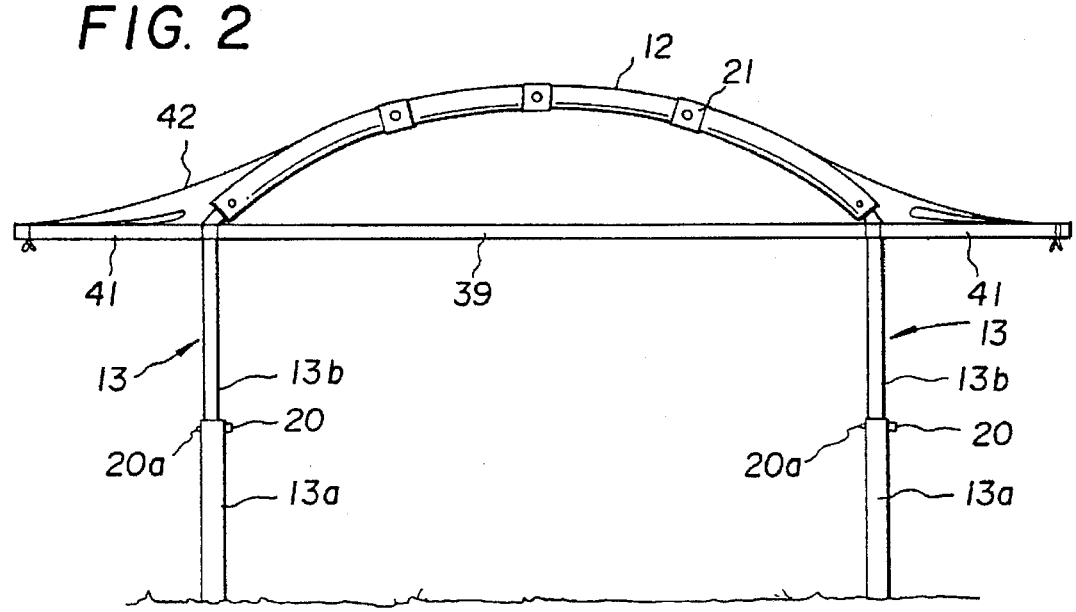
FIG. 2
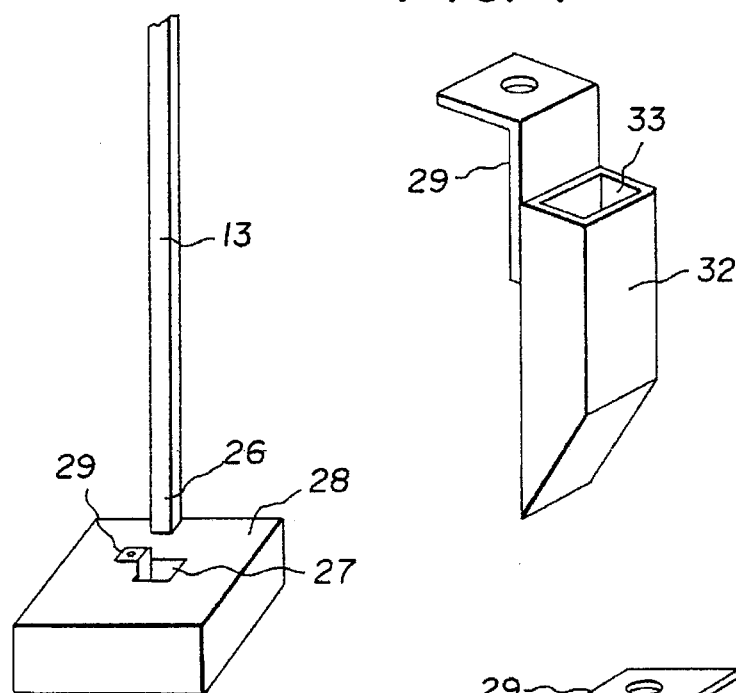
FIG. 3
FIG. 4
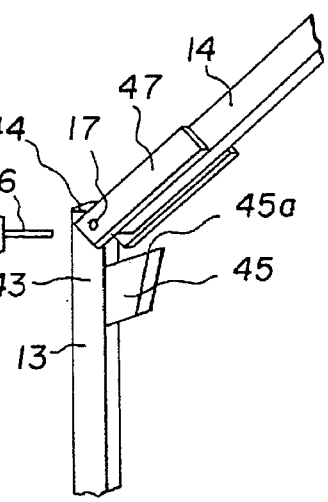
FIG. 5
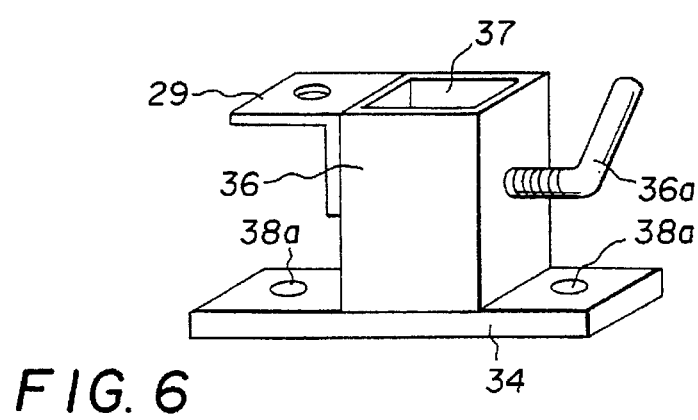
FIG. 6

MODULAR SHELTER

The invention relates to a modular shelter having a framework for supporting a cover sheet, composed of a plurality of frames. Each frame is composed of at least an upward curved arch, and two upstanding members each having an upper end connected to respective ends of the upward curved arch. The framework may further include a plurality of horizontal tie rods, each having two ends each terminated in a in a claw adapted to grip a point on a respective upward curved arch. The invention further includes various devices for attaching the standing members to ground.

BACKGROUND AND PRIOR ART

There is often a need for having a light shelter that can be readily erected and taken down to fill temporary needs for protection against sun and inclement weather.

Various types of such light shelters are known as tents of various types and configurations.

However, none of the known light shelters are modularly expandable from a small single module size to a large size with multiple modules.

Of the known art, U.S. Pat. No. 2,649,102 shows a baby hut with a framework of substantially rectangular frames all interconnected in a manner that does not offer sufficient strength for use in larger sizes and under windy weather conditions.

U.S. Pat. No. 3,749,107 has a framework composed of parallel arches tied together by horizontal tie bars. This kind of shelter, however, requires considerable floor space for the amount of interior volume available, due to the spreading of the arches.

U.S. Pat. No. 3,868,155 shows a structure composed of a plurality of upstanding foldable frames that are foldable to a minimum size package for storage.

It is an object of the present invention to provide a modular shelter that is readily assembled from modular components, is adaptable to various types of ground installation, is easily disassembled, and stored away in compact form, yet takes a minimum of ground area in regard to the volume of space provided in the shelter.

SUMMARY OF THE INVENTION

With the foregoing and further objects in view there is provided a modular shelter having a framework for supporting a cover sheet, the framework including at least two frames each composed of an upward curved arch having two ends and two legs, each leg having an upper end connected to a respective end of the arch by means of respective upward angled connecting members, each member attached at one end to a respective upper end of the legs, each leg having a bottom end, and anchoring means for anchoring the bottom end of each leg to ground.

According to a further feature the anchoring means include a weight having a center hole for receiving the bottom end of a respective leg, or wherein the anchoring means include a ground stake adapted for vertical insertion into ground and having a hole for receiving the bottom end of a respective leg.

According to still another feature, the anchoring means include a bottom plate having bolt holes, and a tubular upstanding collar downwardly attached to the bottom plate, the collar adapted to receive a bottom end of a respective leg, wherein the bolt holes are operative for receiving fastening bolts for fastening the bottom plate to the ground.

According to a still further feature, the cover sheet has a bottom perimeter, and a plurality of ties, the anchoring means having tie points for receiving the ties in a tied connection.

The modular shelter according to the invention may have at least one horizontal tie rod, each tie rod having opposite ends, each end connected to a respective connecting point on a respective upward curved arch.

According to an additional feature of the modular shelter, each opposite end of the tie rod has an end claw having grippers for gripping the upward curved arch of the connecting point, wherein the end claw is composed of two claw halfparts, at least one clamping ring operative for clamping together the claw halfparts, the clamping ring being composed of two clamping ring halfparts, and clamping bolts receivable by the clamping ring halfparts for drawing the clamping ring halfparts together.

The modular shelter according to the invention, including a plurality of telescoping bars, each having opposite ends spaced apart a distance substantially equal to the distance between the upper ends of the standing legs of the frames, and attaching means for attaching the opposite ends of each telescoping bar to a respective upper end of each standing leg, wherein each telescoping bar has at least one telescoping rod extendable from a respective end of the telescoping bar for supporting a side panel of the cover sheet.

According to an additional feature, the standing legs have a rectangular cross-section, and the upward curved arches are made of a flexible plastic material, and the upward curved arches have a circular cross-section.

According to yet another feature, the cover sheet includes a plurality of parallel panels of sheet material, the cover sheet includes at least one end panel, the panels have adjoining edges releasably joined together.

According to a concomitant feature the legs are composed of at least two telescoping parts, and have holes for insertion of locking pins to lock the telescoping parts together.

According to an additional feature the anchoring means include a heavy block of cement, concrete or the like, which has a bottom surface, a frame matching the perimeter of the bottom surface, a top surface, a T-member arranged to bridge the top-surface, the T-member being adapted to receive a lower end of a leg, and bolt or clamping arrangement for clamping the block between the frame and the T-member.

According to still another feature there is provided one or more clamping collars of a flexible material adapted to releasably clamping the sheet material to one of the upward curved arches or a leg. The clamping collar is preferably formed as a tube section with an axially oriented slit that allows the collar to be snapped onto the upward curved arch or a leg over the sheet material.

Other features which are considered as characteristic for the invention are set forth in the appended claims.

Although the invention is illustrated and described herein as embodied in a modular shelter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 2 is an elevational view of the modular shelter showing a telescoping bar for supporting parts of the cover sheet in horizontally extended position;

FIG. 2b is a top-down view of FIG. 2a seen along the line 2b—2b of FIG. 2a.

FIG. 3 is a perspective view of an anchor weight for receiving a bottom end of a standing leg, and having a tie point for tying the cover sheet thereto.

FIG. 4 is a perspective view of a ground spike adapted to be driven into the ground, with a tie point for tying the cover sheet thereto;

FIG. 5 is a fragmentary, perspective view of a pivot point connecting a standing leg to a connecting member;

FIG. 6 is a perspective view of a ground support for a leg adapted to be bolted to ground, and having an upstanding collar for receiving a bottom end of a leg with a tie point for tying the cover sheet to the ground support;

DESCRIPTION OF THE PREFERRED EMBODIMENTS

Figure 1:
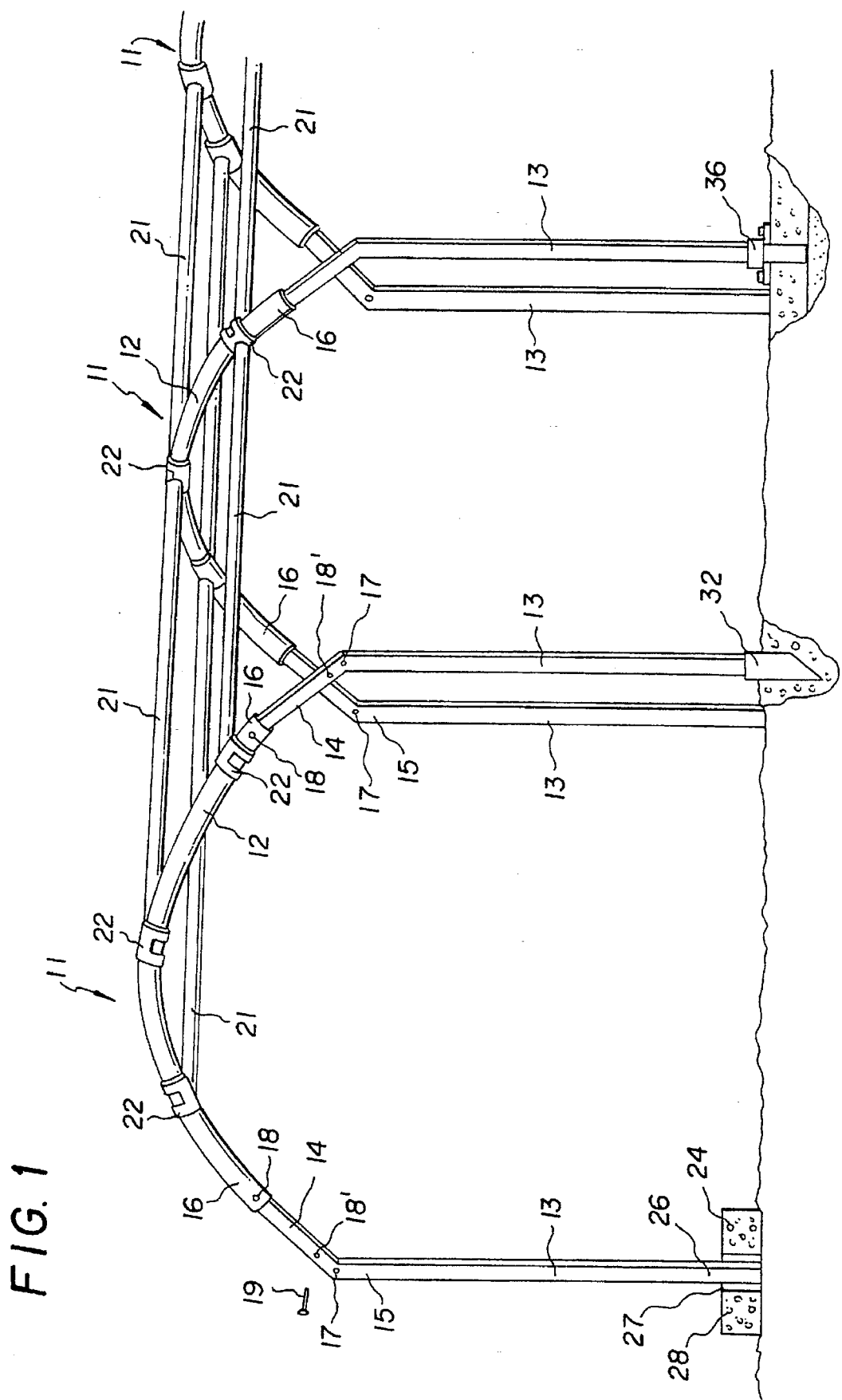
FIG. 1 is a perspective view of the modular shelter showing the framework with the standing legs connected to ground by various means.

In FIG. 1 is shown a framework for supporting a cover sheet of the modular shelter, which includes two frames 11, and a part of a third frame 11. Each frame 11 is composed of an upward curved arch 12 made of tubular material, e.g. plastic or metal tubing, two standing legs 13, each leg having a bottom end 26 secured to ground by various means as shown in the figure, and described in more detail below.

Each upstanding leg 13 has at its upper end 15 an upward angled connecting member 14 adapted to be inserted into respective ends 16 of the upward curved arches 12. The connecting members 14 may advantageously be attached to the upstanding leg 13 at pivot points 17. Use of a pivot point at this location facilitates the assembly of the frames. Conversely a rigid connection may be used at this location.

It is contemplated that the standing legs 13 and the connecting members 14 are made of tubular material with a rectangular or square cross-section. The connecting member 14 is also contemplated as being a straight piece of material that in being inserted into a curved end 16 of the upward curved arch 12 will provide a frictional retaining force between the connecting member 14 and the curved end 16 of the curved arch 12. It should be noted that FIG. 1 shows the connecting members 14 being only partially inserted into the ends of the curved arches 12. In the final assembly it is contemplated that the connecting member 14 is fully inserted into the curved arch 12.

In order to secure the connection between the end of the curved arch 12 and the connecting member 14 holes 18, 18' may be formed in these members to allow a securing pin 19 to be inserted through these holes.

In order to maintain the frames 11 in their proper mutually parallel positions one or more tie rods 21 may be arranged in direction perpendicular to each frame 11, each tie rod 21 being terminated in an end claw 22, described in more detail below, which has two curved halfparts for gripping the curved arches 12, thereby lending rigidity to the entire frame work.

In FIG. 1 only three sets of tie rods 21 are shown for the sake of clarity. The end claws 22 are configured such that they can be clamped around the arches 11, as described in more detail below. It follows that any suitable number of tie rods may be applied as required in order to provide adequate rigidity of the entire framework.

In order to secure the entire modular shelter to the ground various securing arrangements may be used as suitable for the location of the shelter.

In FIG. 1 the leftmost frame 11 is shown with the bottom end 26 of the leg 13 received in a hole 27 formed in a weighted anchor block 28 made of e.g. cast concrete or the like, of sufficient weight to hold the frame in place. The anchor block 28 is shown in more detail in FIG. 3, wherein a tie point in the form of an angle bracket 29 or the like is provided in order to secure the bottom edge of a cover sheet 31, seen in FIG. 7.

Another form of ground attachment is shown in FIG. 4, wherein a hollow ground spike 32 has a hollow interior 33 for receiving a bottom end 26 of a standing leg 13. Again a tie point 29 is connected with the ground spike for tying the bottom edge 61 of the cover sheet 31.

Still another ground attachment is shown as a T-member 36 in FIG. 6, wherein a bottom plate 34 has an upstanding collar 36 attached thereto. The collar 36 has an interior 37 adapted to receive a bottom end of a standing leg 13, a tie point 29 connected therewith for tying a bottom edge 61 of the cover sheet 31 thereto, and a setscrew 36a for securing the bottom end of the leg 13 to the T-member 36. The ground attachment of FIG. 6 is especially suitable for attachment to a solid surface 38 (FIG. 1) such as concrete, asphalt, wood or the like, by means of anchor bolts (not shown) inserted in bolt holes 38a of the bottom plate 34.

Figure 14:
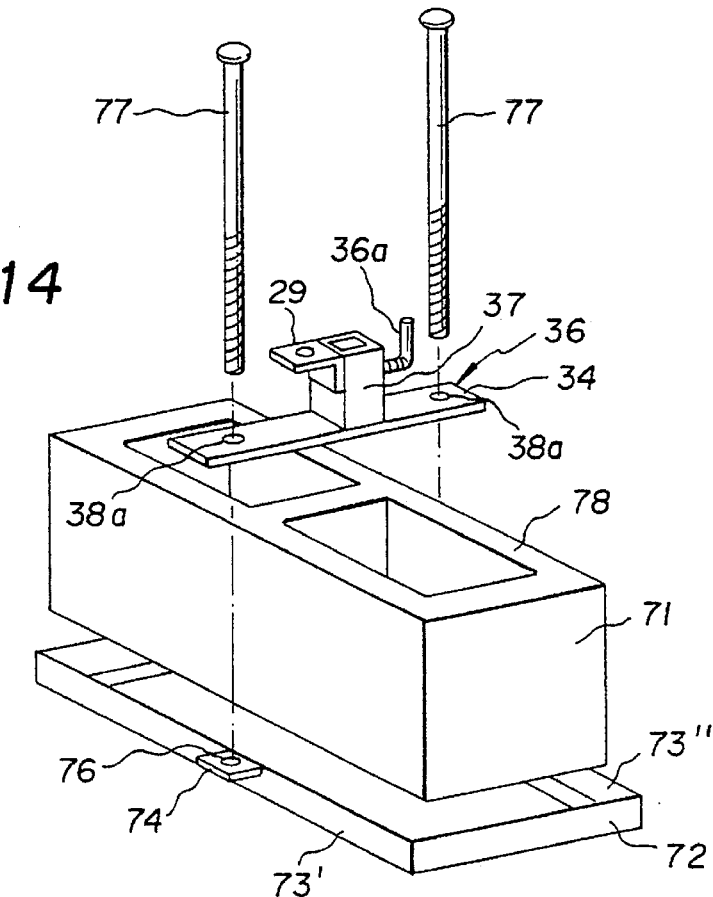
FIG. 14 is perspective view of an anchoring arrangement including a weighting block, and attaching parts for attaching the weighting block to a leg.

FIG. 14 shows another ground attachment which includes a block 71, e.g. in the form of a conventional concrete building block as widely used for masonry walls. A bottom frame 72 of, e.g. rectangular shape matching the bottom surface of the block 71 has opposite side members 73', 73", each having a bracket 74 with a bolt hole 76 for attaching a T-member 36 across the upper surface 78 of block 71, e.g. as shown in FIG. 6, by means of bolts 77, vertically inserted through bolt holes 38a of the T-member, and attached to the bottom frame 72 at brackets 74, e.g. by means of screw threads in bolt holes 76.

Figure 2A:
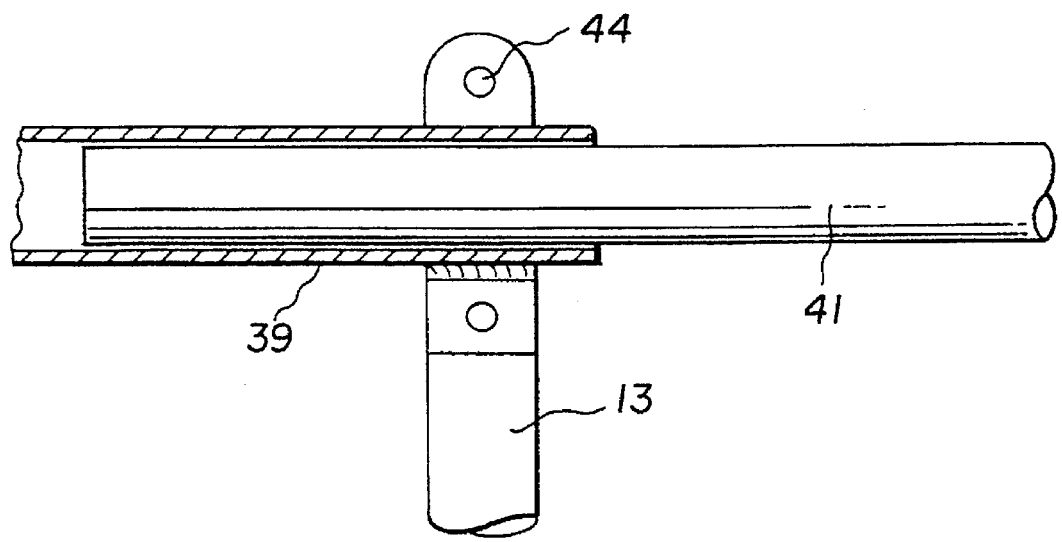
FIG. 2a is an elevation of a telescoping bar with a telescoping rod extending therefrom.
Figure 2B:
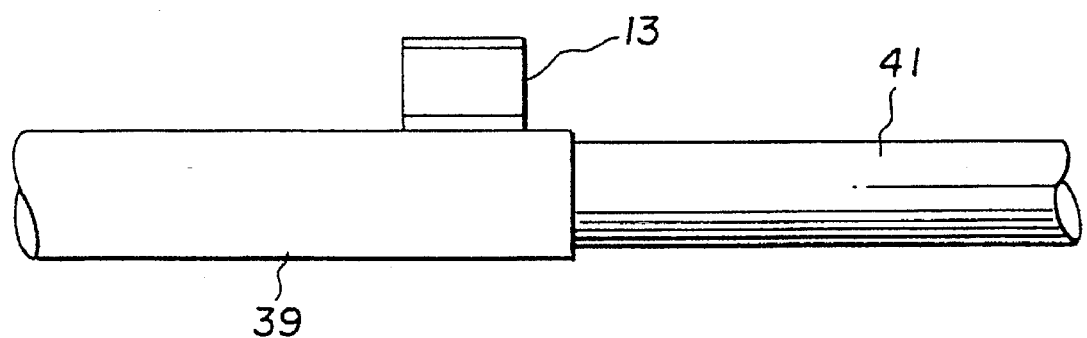

FIG. 2 is an end view of the modular shelter showing the upward curved arch 12 and the standing legs 13, and a hollow telescoping bar 39 attached in horizontal position to the top ends of legs 13 by suitable means, such as bolts, screws, pins, or the like. A telescoping rod 41 is inserted into one or both ends of the telescoping bar 39, which can be extended horizontally, as shown in the figure, and used for attachment of one or both side panels 42 of the cover sheet 31, thereby rendering the shelter open at one or both sides. In one arrangement the side panel 42 may be rolled up as seen in FIG. 2, with the telescoping rods 41 only partially extended, depending upon the amount of horizontal shelter desired.

FIG. 2 also shows each of the legs 13 optionally composed of at least two telescoping parts 13a and 13b so that the length of each leg can be adjusted to fit particular height requirements for the modular shelter. In order to lock the telescoping parts together holes 20a are formed in the telescoping parts 13a, 13b for insertion of locking pins 20 in the telescoping parts.

FIG. 5 shows details of the pivot point 17 connecting the top end 43 of a leg 13 and the bottom end of a connecting member 14. A bolt hole 44 serves to receive a pivot pin or bolt 46. Two reinforcing plates 47 may be arranged on opposite sides of the connecting member 14.

FIG. 5 also shows an optional stop 45 attached to the top end of a leg 13. The stop 45 has an upward sloping upper edge 45a, which serves to prevent the leg from deviating outward more than a given distance, which is advantageous, especially during setup of the modular shelter.

Figure 7:
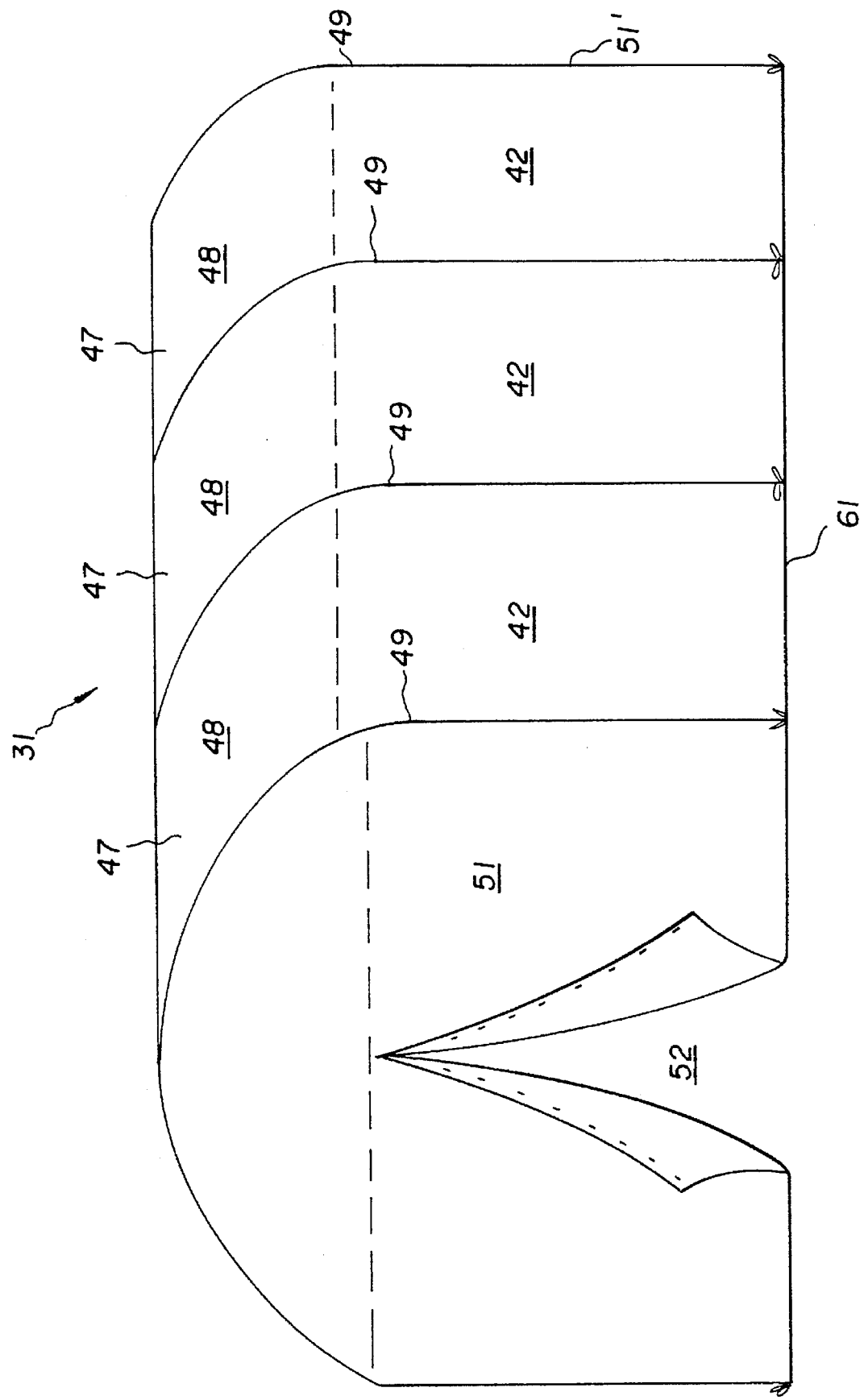
FIG. 7 is a perspective view of an assembled modular shelter, showing three modules with cover sheet and an end panel with an entrance opening.

FIG. 7 shows the exterior skin, or cover sheet 31 for the modular shelter, which may be made of any of various types of sheet material such as canvas, cloth, plastic sheets, etc., suitable for keeping out wind, sunlight, dust and the like. The cover sheet 31 is advantageously made of parallel panels 47, each having two vertical side panels 42 and a top panel 48. The panels 47 may be, optionally, joined at the parallel panel edges 49 by suitable detachable means, such as zippers, lacings, snap fasteners, tie straps, hook and pile fasteners (Velcro®) or the like, so that the cover sheet 31 can be expanded by attaching additional panels 47 and frames 11. The cover sheet 31 may also have a front panel 51, and an opposite end panel 51', not seen in FIG. 7.

Either front and/or end panel 51, 51' may have an access opening 52 that may be closable by suitable means, such as a zipper, snap-fasteners, tie straps, or the like.

Figure 8:
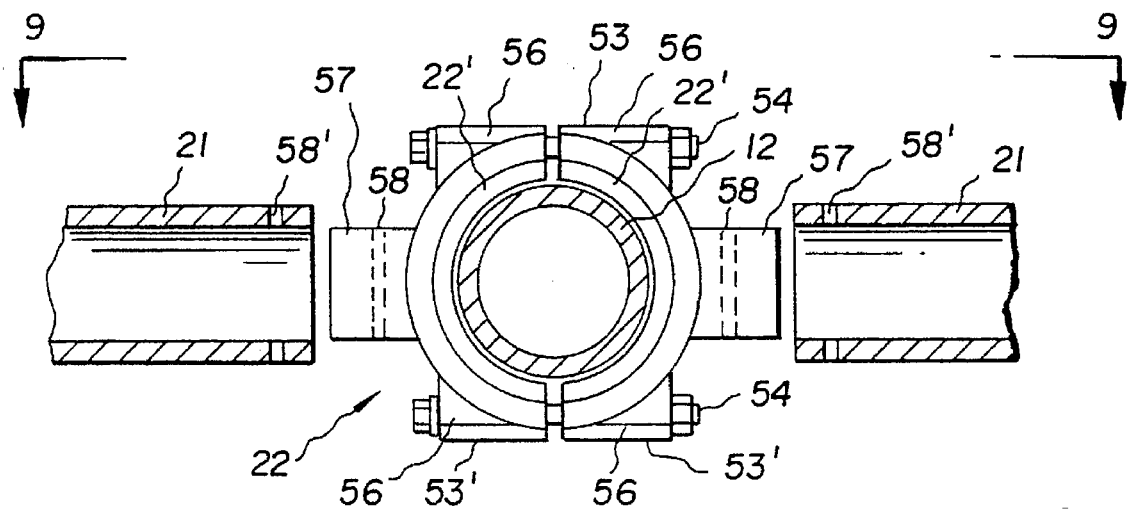
FIG. 8 is a side view of two end claws, showing its two halfparts gripping around an upward curved arch, seen in cross-section with clamping rings.
Figure 9:
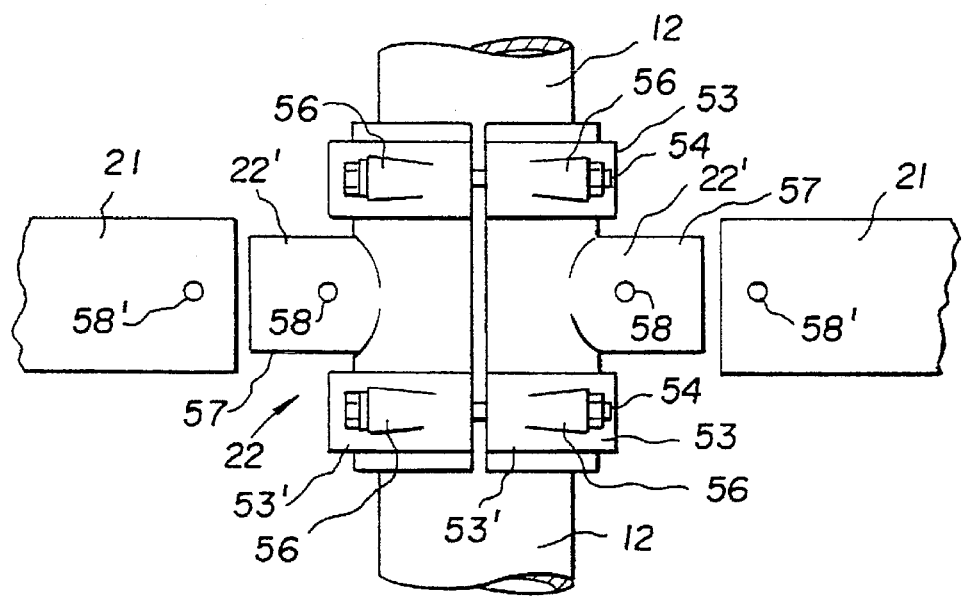
FIG. 9 is a top-down view of the end claw halfparts of FIG. 8, seen along the line 9—9 of FIG. 8.

FIGS. 8 and 9 show one of the end claws 22, each composed of two identical half claws 22' that grip around the curved arch 12, and are clamped together by means of two clamping rings 53. Each clamping ring 53 is composed of two clamping ring halfparts 53', which are drawn together by clamping bolts 54. The two bolts 54 are inserted through respective holes in shoulder sections 56, that extend radially from the clamping ring halfparts 53'. Each half claw 22' has stub extensions 57, that can be inserted into a respective end of a tie rod 21, and fastened to the tie rod by means of cross bolts (not shown) inserted through holes 58 in the stub extensions 57, and holes 58' aligned with holes 58 in the ends of the rods 21.

FIGS. 10-13 show an embodiment of the end claws 22 in a digitated construction, wherein each end claw has two outer curved fingers 61, and a single inner curved finger 62. The outer curved fingers 61 and the inner curved finger 62 are adapted to curve around and grip the upward curved arch 12. The claws 22 with fingers 61, 62 are made of an elastic material such as metal or plastic, so that the fingers are able to "snap" over the upward curved arch 12, as shown in the figures. Each end of each finger 61, 62 may have increased thickness in the form of a "pad" 63, which improves the retention of the claw, when snapped into the upward curved arch 12.

It will be appreciated from the above description that two claws can be mutually rotated 180° so that they can be inserted from opposite sides with the fingers 61, 62 interdigitated and gripping the upward curved arch 12 from opposite sides. In order to provide a locking grip on the upward curved arch, holes 64 can be formed in the fingers, with matching holes in the upward curved arch 12 for receiving locking pins 66, shown in FIG. 13.

In another locking arrangement, the pads 63 at the ends of the fingers 61, 62 can be formed as hooks that grip matching indentations in the upward curved arch 12.

Figure 10:
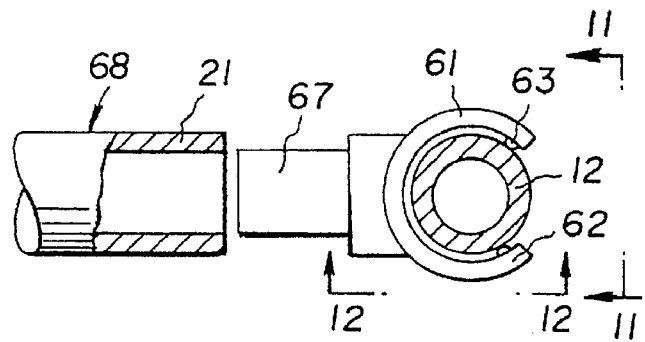
FIG. 10 is an elevational side view of the end claw of a digitated construction seen along the line 10—10 of FIG. 12.
Figure 11:
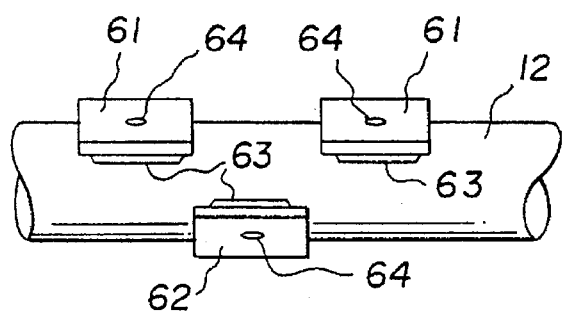
FIG. 11 is an elevational view of the digitated end claw seen along the line 11—11 of FIG. 10.
Figure 12:
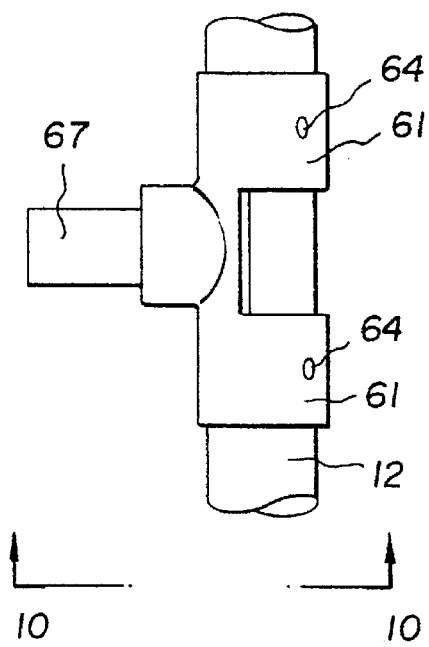
FIG. 12 is a top-down view of the digitated claw seen along the line 12—12 of FIG. 10.
Figure 13:
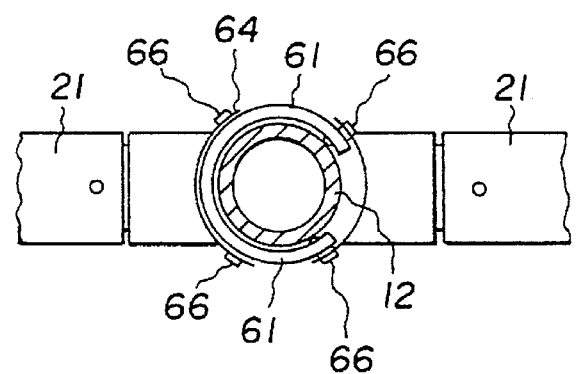
FIG. 13 is a side view of two digitated claws hooked together around an upward curved arch.

FIGS. 10 and 12 show the end claws adapted to include a stub 67 that slidably fits into a hollow interior of respective ends 68 of the tie rods 21, and secured thereto by means of adhesive, pins, screws or any other suitable securing arrangement.

Figure 15:
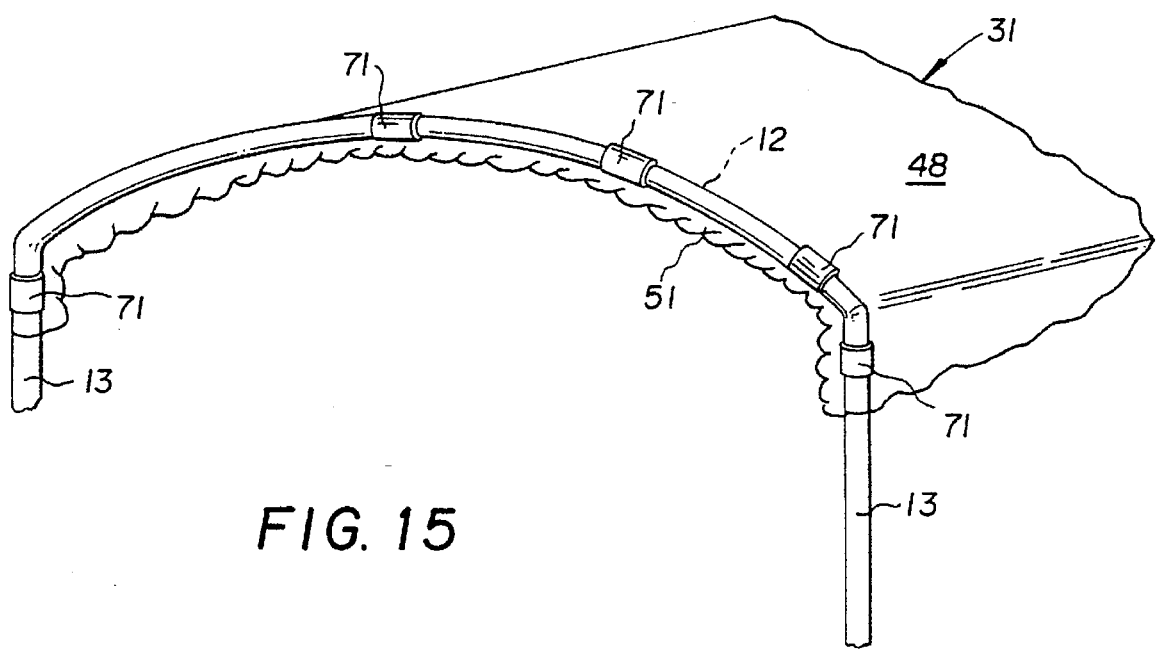
FIG. 15 is a perspective fragmentary end view of a modular shelter, and a plurality of clamping collars for attaching sheet material to an upward curved arch and/or a leg.
Figure 17:
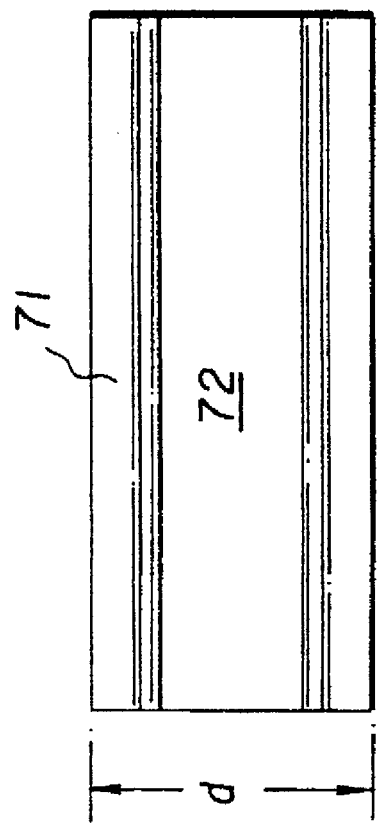
FIG. 17 is a side view of the clamping collar in its relaxed state.
Figure 16:
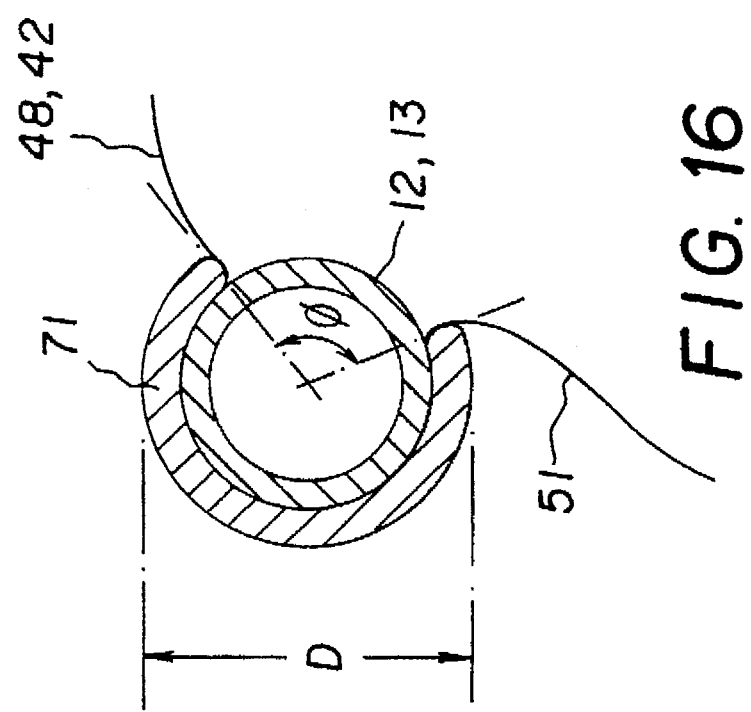
FIG. 16 is cross-section through a clamping collar snapped onto an upward curved arch over a section of exterior skin or material.

FIGS. 15, 16 and 17 show an arrangement for releasably attaching the exterior skin or cover sheet 31 to the upward curved arches 12 and legs 13 by means of flexible clamping collars 71, that can be releasably "snapped" onto the upward curved arch 12 or leg 13 over the cover sheet 48, 51, as shown in more detail in FIG. 16.

FIG. 16 shows i cross-section an upward curved arch 12 and/or a leg 13, having e.g. circular cross-sections, and a clamping collar 71. The clamping collar 71 is formed as a flexible tube section and made of a strong flexible material, such as plastic or sheet metal. The tube section 71 has a slit 72 that enables the collar 71 to be snapped onto the upward curved arch 12, or leg 13 over the cover sheet material shown in FIG. 16 as part of the top panel 48, and part of the end panel 51, and/or the side panel 42. It follows that the sheet material 31 must have enough looseness or slack to allow the clamping collar 71 to be snapped onto the frame structure.

FIG. 17 shows the clamping collar 71 in its "relaxed" state, i.e. before it is clamped onto a tubular frame member. The slit 72 is oriented i axial direction of the clamping collar. It follows that the outside diameter d of the clamping collar 71 is less in its relaxed state than its outside diameter D in its clamped-on state, as seen in FIG. 16. It also follows that the clamping collar 71 must have a slit-angle $\phi$ which, in the clamped-on state is less than 180° angle in order to maintain a secure grip on the frame member 12, 13.

I claim:

1. A modular shelter comprising a framework for supporting a cover sheet, the framework including at least two frames each composed of an upward curved arch having two ends and two legs, each leg having an upper end connected to a respective end of said arch by means of respective upward angled connecting members, each connecting member attached to a respective upper end of said legs, each leg having a bottom end, and anchoring means for anchoring the bottom end of each leg to ground; at least one horizontal tie rod, said tie rod having opposite ends, each opposite end connected to a respective connecting point on a respective upward curved arch; wherein each opposite end of said tie rod has an end claw having grippers for gripping said upward curved arch at said connecting point; and wherein said grippers of each claw include two outer curved fingers and an inner curved finger, wherein said inner curved finger is adapted to fit in a space between said outer fingers.

2. A modular shelter according to claim 1, wherein said anchoring means include a weight having a center hole for receiving the bottom end of a respective leg.

3. A modular shelter according to claim 1, wherein said anchoring means include a stake adapted for vertical insertion into ground and having a hole for receiving the bottom end of a respective leg.

4. A modular shelter according to claim 1, wherein said anchoring means include a bottom plate having bolt holes, and a tubular upstanding collar downwardly attached to said bottom plate, said collar adapted to receive the bottom end of a respective leg, wherein said bolt holes are adapted to receive fastening bolts for fastening said bottom plate to the ground.

5. A modular shelter according to claim 1, wherein said cover sheet has a bottom perimeter, and a plurality of ties, said anchoring means having tie points for receiving said ties in a tied connection.

6. A modular shelter according to claim 1, wherein said standing leg has a rectangular cross-section.

7. A modular shelter according to claim 1, wherein said upward curved arch is made of a flexible plastic material.

8. A modular shelter according to claim 1, wherein said upward curved arch has a circular cross-section.

9. A modular shelter according to claim 1, wherein said cover sheet is composed of a plurality of parallel panels of sheet material.

10. A modular shelter according to claim 9, wherein said cover sheet includes at least one end panel.

11. A modular shelter according to claim 9, wherein said panels have adjoining edges releasably joined together.

12. A modular shelter according to claim 11, wherein said adjoining edges are releasably joined together by means of at least one of zippers, snap fasteners, lacings, hook and pile fasteners, and tie straps.

13. A modular shelter according to claim 1, wherein at least one of said legs is composed of at least two telescoping parts.

14. A modular shelter according to claim 11, wherein said curved fingers are made of an elastic material, and have inward facing pads at their ends.

15. A modular shelter according to claim 14, wherein said pads are shaped as hooks aligned with matching indentations in said upward curved arch.

16. A modular shelter according to claim 1, wherein said anchoring means include an anchor block having a substantially rectangular bottom surface, a top surface, a bottom frame substantially matching said bottom surface, a T-member adapted to bridge said top surface, and bolt means disposed between said T-member and said bottom frame for tightly securing said anchor block between said T-member and said bottom frame.

17. A modular shelter according to claim 1, including at least one clamping collar for releasably clamping said cover sheet to at least one of said upward curved arches and said legs.

18. A modular shelter according to claim 17, wherein said clamping collar includes a flexible tube section having an axially directed slit for releasably snapping said clamping collar around at least one of said upward curved arches and said legs over said end panel.

19. A modular shelter comprising a framework for supporting a cover sheet, the framework including at least two frames each composed of an upward curved arch having two ends and two legs, each leg having an upper end connected to a respective end of said arch by means of respective upward angled connecting members, each connecting member attached to a respective upper end of said legs, each leg having a bottom end, and anchoring means for anchoring the bottom end of each leg to ground; including a plurality of telescoping bars, each having opposite ends spaced apart a distance substantially equal to the distance between respective upper ends of the legs of a respective frame, and attaching means for attaching the opposite ends of each telescoping bar to a respective upper end of each leg, wherein each telescoping bar has at least one telescoping rod extendable from a respective end of said telescoping bar for horizontally supporting a side panel of said cover sheet.

* * * * *